United States Patent
Chen et al.

(10) Patent No.: US 9,828,531 B2
(45) Date of Patent: Nov. 28, 2017

(54) WATERBORNE ADHESIVES

(71) Applicants: Rohm and Haas Company, Philadelphia, PA (US); Dow Global Technologies LLC, Midland, MI (US)

(72) Inventors: Mai Chen, Chicago, IL (US); Jeffrey A. Mytnik, Des Plaines, IL (US); Timothy J. Young, Bay City, MI (US); Mechelle Ann Churchfield, Midland, MI (US)

(73) Assignees: DOW GLOBAL TECHNOLOGIES LLC, Midland, MI (US); ROHM AND HAAS COMPANY, Philadelphia, PA (US)

( * ) Notice: Subject to any disclaimer, the term of this patent is extended or adjusted under 35 U.S.C. 154(b) by 301 days.

(21) Appl. No.: 14/655,554

(22) PCT Filed: Dec. 5, 2013

(86) PCT No.: PCT/US2013/073241
§ 371 (c)(1),
(2) Date: Jun. 25, 2015

(87) PCT Pub. No.: WO2014/105380
PCT Pub. Date: Jul. 3, 2014

(65) Prior Publication Data
US 2015/0361312 A1 Dec. 17, 2015

Related U.S. Application Data

(60) Provisional application No. 61/746,743, filed on Dec. 28, 2012.

(51) Int. Cl.
| | | |
|---|---|---|
| C09J 125/14 | (2006.01) |
| C09J 175/04 | (2006.01) |
| C09J 11/06 | (2006.01) |
| C08K 5/09 | (2006.01) |
| C08G 18/73 | (2006.01) |
| C08K 5/20 | (2006.01) |
| C09J 123/08 | (2006.01) |
| C09J 133/08 | (2006.01) |
| C08L 23/08 | (2006.01) |
| C09J 7/02 | (2006.01) |
| C08K 5/098 | (2006.01) |

(52) U.S. Cl.
CPC ............... *C09J 125/14* (2013.01); *C08K 5/09* (2013.01); *C08K 5/20* (2013.01); *C08L 23/0853* (2013.01); *C08L 23/0869* (2013.01); *C09J 7/0207* (2013.01); *C09J 11/06* (2013.01); *C09J 123/0853* (2013.01); *C09J 123/0869* (2013.01); *C09J 133/08* (2013.01); *C09J 175/04* (2013.01); *C08G 18/73* (2013.01); *C08G 2170/80* (2013.01); *C08K 5/098* (2013.01); *Y10T 156/10* (2015.01); *Y10T 428/31935* (2015.04)

(58) Field of Classification Search
None
See application file for complete search history.

(56) References Cited

U.S. PATENT DOCUMENTS

| | | |
|---|---|---|
| 3,811,830 A | 5/1974 | DeMarco |
| 4,015,999 A | 4/1977 | Robertson et al. |
| 7,361,694 B2 | 4/2008 | Strandburg et al. |
| 2005/0100754 A1 | 5/2005 | Moncla et al. |
| 2005/0173348 A1 | 8/2005 | Drake |
| 2005/0271888 A1 | 12/2005 | Moncla et al. |
| 2012/0077026 A1* | 3/2012 | Igarashi .............. C08K 5/20 428/343 |
| 2014/0093740 A1 | 4/2014 | Chen |

FOREIGN PATENT DOCUMENTS

| | | |
|---|---|---|
| WO | 9820119 A1 | 5/1998 |
| WO | 0220684 A2 | 3/2002 |
| WO | 02090474 A1 | 11/2002 |
| WO | 2008033975 A1 | 3/2008 |
| WO | 2010030196 A1 | 3/2010 |
| WO | 2011053904 A1 | 5/2011 |
| WO | 2012158601 A1 | 11/2012 |

* cited by examiner

*Primary Examiner* — Sheeba Ahmed
(74) *Attorney, Agent, or Firm* — Carl P. Hemenway

(57) ABSTRACT

Provided is an adhesive composition comprising a continuous aqueous medium and further comprising (i) particles of a polymer dispersed in said aqueous medium; and (ii) particles comprising fatty amide and one or more fatty acid, wherein 50 mole % or more of said fatty acid is in the carboxylate form, and wherein the weight ratio of said fatty amide to said fatty acid is from 0.12:1 to 2.3:1, wherein said particles comprising fatty amide and one or more fatty acid are dispersed in said aqueous medium. Also provided is a method of bonding substrates using such an adhesive composition and a bonded structure made by such a method.

5 Claims, No Drawings

WATERBORNE ADHESIVES

The following is the background of the invention.

It is often desired to bond two or more substrates together using an adhesive composition in situations in which one or more of the substrates contains a slip agent. For example, a bonded article may be formed by bonding two substrates made of polymer together by putting an adhesive composition in contact with both substrates to form a bond between the substrates. Sometimes, one or both of the substrates is made of a polymer that contains a slip agent. Such a slip agent is sometimes added to a polymer so that the surface of a substrate made from that polymer will have relatively low coefficient of friction. One problem that arises in such systems is that the slip agent may migrate from the substrate into the adhesive, thereby depleting the amount of slip agent in the substrate and consequently increasing the coefficient of friction of that substrate.

One method that has been used in the past to reduce depletion of slip agent from the substrate has been to incorporate some slip agent into the adhesive composition prior to bonding with the substrate. For example, when the adhesive composition is either a solvent-free adhesive composition or is a composition in which the adhesive is dissolved in an organic solvent, it is often possible to dissolve some slip agent in the adhesive composition. Then, when a layer of the adhesive composition is formed on a surface of a substrate that contains slip agent, the layer of adhesive will also contain some slip agent, and the presence of slip agent in the layer of adhesive composition will reduce the tendency toward depletion of slip agent from the substrate. The substrate will therefore maintain its relatively low coefficient of friction.

It is often desired to use an adhesive composition that is waterborne. Slip agents are not normally soluble in water, and addition of slip agent to a waterborne composition usually results in a mixture that is unacceptable because of phase separation, instability, or other undesirable result of incompatibility of the ingredients. Therefore, in the past, the method described above for maintaining the coefficient of friction of the substrate by adding slip agent to the adhesive composition has not been available when the adhesive composition is waterborne.

WO 2012/158602 describes a waterborne adhesive composition that is designed to resist migration of slip aid from a substrate into the adhesive. It is desired to provide a waterborne adhesive composition that contains one or more fatty amide slip agent.

The following is a statement of the invention.

The first aspect of the present invention is an adhesive composition comprising a continuous aqueous medium and further comprising (i) particles of a polymer dispersed in said aqueous medium; and (ii) particles comprising fatty amide and one or more fatty acid, wherein 50 mole % or more of said fatty acid is in the carboxylate form, and wherein the weight ratio of said fatty amide to said fatty acid is from 0.12:1 to 2.3:1, wherein said particles comprising fatty amide and one or more fatty acid are dispersed in said aqueous medium.

The second aspect of the present invention is a method of bonding a first substrate to a second substrate, wherein said method comprises (a) applying a layer of the composition of the first aspect of the present invention to a surface of said first substrate, (b) drying said layer of the composition of claim 1 to remove water, and (c) contacting a surface of said second substrate to said layer, wherein one or both of said first substrate and said second substrate comprises one or more slip agent.

The third aspect of the present invention is a bonded structure formed by the method of the second aspect of the present invention.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymer molecular weights can be measured by standard methods such as, for example, size exclusion chromatography (SEC, also called gel permeation chromatography or GPC). Polymers have weight-average molecular weight (Mw) of 1,000 or more. Some polymers exhibit one or more glass transition temperature (Tg). Tg is determined using differential scanning calorimetry with the midpoint method.

As used herein "weight of polymer" means the dry weight of polymer.

Molecules that can react with each other to form the repeat units of a polymer are known herein as "monomers." Vinyl monomers are monomers that have at least one carbon-carbon double bond that is not part of an aromatic ring and that is capable of participating in a polymerization reaction with other carbon-carbon double bonds. Vinyl monomers have molecular weight of less than 500. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate, acrylonitrile, (meth)acrylic acids, alkyl esters of (meth)acrylic acid, amides of (meth)acrylic acid, vinyl chloride, halogenated alkenes, and mixtures thereof. As used herein, "(meth)acrylic" means acrylic or methacrylic; "(meth)acrylate" means acrylate or methacrylate; and "(meth)acrylamide" means acrylamide or methacrylamide. "Substituted" means having at least one attached chemical group such as, for example, alkyl group, alkenyl group, vinyl group, hydroxyl group, carboxylic acid group, other functional groups, and combinations thereof.

As used herein, an acid-functional monomer is a monomer that contains a carboxyl group or a sulfonic acid group. The carboxyl group and the sulfonic acid group may be in protonated form or in ionic form.

An aromatic vinyl monomer is a vinyl monomer the molecule of which contains one or more aromatic ring. A vinyl monomer that is not an aromatic vinyl monomer is referred to herein as a "non-aromatic vinyl monomer." An olefin monomer is a vinyl monomer the molecule of which contains only hydrogen and oxygen.

A polymer that is made by polymerizing a certain monomer, either alone or with other monomers, is said herein to include that monomer as a polymerized unit.

As used herein, a monomer is nonionic if, when a polymer that contains polymerized units of that monomer is present in water, there is no pH condition between pH of 2.5 and a pH of 9 at which the polymerized units of that monomer are ionized. A polymerized unit is considered herein to be ionized if 50 mole percent or more of those polymerized units, based on the total moles of those polymerized units, are in an ionic state.

As used herein, a "vinyl polymer" is a polymer in which 90% or more by weight, based on the weight of the polymer, is polymerized units of one or more vinyl monomer.

As used herein, a "waterborne" composition is a composition that contains water in the amount of 30% or more by weight, based on the weight of the composition. In a waterborne composition, water forms a continuous medium, and all the other ingredients are dissolved or dispersed or a combination thereof in the water.

As used herein the "solids level" of a waterborne composition is the amount of material that is left behind when a layer of the waterborne composition is applied to a substrate and then dried or allowed to dry. Solids level may be measured by making a layer of the waterborne composition that is 1 mm to 2 mm in depth in a container that is open at the top; and placing that container in a circulating-air oven at 100° C. for 30 minutes. The solids level, expressed as a percentage, is 100*(LB)/(IC), where LB is the weight of material from the waterborne composition that remains in the container after the oven exposure, and IC is the initial weight of the waterborne composition. The material from the waterborne composition that remains in the container after the oven exposure is known herein as the "solids portion" of the composition.

As used herein, an "adhesive composition" is a composition that is capable of binding together two substrates when placed in contact with both of the substrates (possibly after drying and/or heating the composition).

As used herein, a "polyol" is a compound the molecule of which contains two or more hydroxyl groups. As used herein, a "polyisocyanate" is a compound the molecule of which contains two or more isocyanate groups.

As used herein, a dispersion is a composition that contains discrete particles that are distributed throughout a continuous liquid medium. The distributed particles are said to be dispersed. Each discrete particle may be solid, liquid, or a combination thereof. The continuous liquid medium is liquid over a range of temperature that includes 10° C. to 40° C. The continuous liquid medium is an aqueous medium if the composition of the continuous liquid medium contains water in the amount of 60% or more by weight based on the weight of the continuous liquid medium.

The composition of a collection of particles is considered herein to be uniform if the composition does not vary substantially among the particles.

As used herein, a fatty acid has the chemical formula $R^1$—COOH, where $R^1$ is a substituted or unsubstituted hydrocarbyl group that contains 8 or more carbon atoms. As used herein, the term fatty acid is meant to include both the carboxyl form $R^1$—COOH and the carboxylate form $R^1$—COO$^\ominus$. The carboxylate form may be in solution or in a salt.

As used herein, a fatty amide has the chemical formula $R^2$—C(O)NHR$^3$, where $R^2$ is a substituted or unsubstituted hydrocarbyl group that contains 8 or more carbon atoms, and where $R^3$ is selected from the following:
(I) $R^3$ is hydrogen ("type I" fatty amide)
(II) $R^3$ is an aliphatic unsubstituted hydrocarbyl group ("type II" fatty amide), or
(III) $R^3$ has the structure —$CH_2CH_2$—NHC(O)—$R^4$, where $R^4$ is a substituted or unsubstituted hydrocarbyl group that contains 8 or more carbon atoms ("type III" fatty amide).

Erucamide has the chemical formula $CH_3$—$(CH_2)_7$—CH=CH—$(CH_2)_{11}$—C(O)—$NH_2$. Erucic acid has the chemical formula $CH_3$—$(CH_2)_7$—CH=CH—$(CH_2)_{11}$—C(O)—OH. Oleamide has the chemical formula $CH_3$—$(CH_2)_7$—CH=CH—$(CH_2)_7$—C(O)—$NH_2$. Oleic acid has the chemical formula $CH_3$—$(CH_2)_7$—CH=CH—$(CH_2)_7$—C(O)—OH.

As used herein, the statement that a ratio is "X:1 or higher" means that the ratio is Y:1, where Y is equal to or higher than X. For example, a ratio that is said to be "3:1 or higher" could be 3:1 or 4:1 or 100:1 but could not be 2.9:1. Similarly, the statement that a ratio is "W:1 or lower" means that the ratio is Z:1, where Z is equal to or lower than W. For example, a ratio that is said to be "20:1 or lower" could be 20:1 or 19:1 or 0.15:1 but could not be 21:1.

As used herein, "room temperature" is approximately 25° C.

The present invention involves a continuous liquid medium that is an aqueous medium. Preferably, the amount of water in the aqueous medium is, by weight based on the weight of the aqueous medium, 70% or more; more preferably 80% or more; more preferably 90% or more.

In preferred compositions of the present invention, the solids level is 30% or more. In preferred compositions of the present invention, the solids level is 65% or less.

The composition of the present invention contains one or more polymer. Suitable polymers include any polymer that can be dispersed as particles in an aqueous medium, including, for example, water dispersible polyurethanes, water dispersible vinyl polymers, including ethylene/vinyl acetate copolymers and other vinyl polymers. Preferred are vinyl polymers. Preferred vinyl polymers contain polymerized units of one or more (meth)acrylate. A (meth)acrylate is an alkyl ester of (meth)acrylic acid; in which the alkyl group may be substituted or unsubstituted. Preferred are substituted or unsubstituted alkyl groups having 2 or more carbon atoms; more preferred is 4 or more carbon atoms. Preferred are substituted or unsubstituted alkyl groups having 20 or fewer carbon atoms; more preferred is 10 or fewer; more preferred is 8 or fewer. Among substituted alkyl groups, preferred are those substituted with hydroxyalkyl groups. More preferred are unsubstituted alkyl esters of (meth) acrylic acid. More preferred are unsubstituted alkyl esters of acrylic acid.

In polymers of the present invention, the preferred amount of polymerized units of (meth)acrylates is, by weight based on the weight of the polymer, 20% or more; more preferred is 40% or more; more preferred is 50% or more. The preferred amount of polymerized units of (meth)acrylates is, by weight based on the weight of the polymer, 80% or less; more preferred is 70% or less.

Polymers that contain polymerized units of one or more (meth)acrylate optionally contain polymerized units of one or more additional vinyl monomer.

Preferred polymers of the present invention contain polymerized units of one or more nonionic aromatic vinyl monomer, one or more unsubstituted alkyl ester of methacrylic acid, or a mixture thereof. More preferred polymers of the present invention contain polymerized units of one or more nonionic aromatic vinyl monomer. When a nonionic aromatic vinyl monomer is used, preferred nonionic aromatic vinyl monomers are styrene and alkyl-substituted styrenes; more preferred are styrene and alpha-methyl styrene; more preferred is styrene. When an unsubstituted alkyl ester of methacrylic acid is used, preferred alkyl groups have 4 or fewer carbon atoms; more preferred alkyl groups have 2 or fewer carbon atoms; more preferred is methyl.

More-preferred polymers of the present invention contain polymerized units of one or more unsubstituted alkyl ester of acrylic acid and also contain polymerized units of either one or more nonionic aromatic vinyl monomer, one or more unsubstituted alkyl ester of methacrylic acid, or a mixture thereof. Even more preferred polymers of the present invention contain polymerized units of one or more unsubstituted alkyl ester of acrylic acid and also contain polymerized units of one or more nonionic aromatic vinyl monomer.

The preferred amount of polymerized units of nonionic aromatic monomer is, by weight based on the weight of the polymer, 5% or more; more preferred is 10% or more; more preferred is 20% or more. The preferred amount of polymerized units of nonionic aromatic monomer is, by weight based on the weight of the polymer, 60% or less; more preferred is 50% or less; more preferred is 40% or less.

Preferable polymers of the present invention contain polymerized units of one or more acid-functional monomer. Preferred acid-functional monomers are aromatic vinyl monomers having one or more sulfonic acid group attached to an aromatic ring, and (meth)acrylic acid; more preferred are styrene sulfonic acid, and (meth)acrylic acid; most preferred are (meth)acrylic acid. Preferably, the amount of polymerized units of acid-functional monomer is, by weight based on the weight of the polymer, 0.1% or more; more preferably 0.3% or more; more preferably 1% or more. Preferably, the amount of polymerized units of acid-functional monomer is, by weight based on the weight of the polymer, 10% or less; more preferably 5% or less.

The polymer of the present invention optionally contains polymerized units of one or more monomers in addition to one or more (meth)acrylate; one or more nonionic aromatic vinyl monomer; and one or more acid-functional monomer. If one or more of such additional monomer is present, such additional monomers are preferably chosen from nonionic vinyl monomers. Preferred additional monomers are amides of (meth)acrylic acid, hydroxyalkyl esters of (meth)acrylic acid, and mixtures thereof. Preferred amides of (meth)acrylic acid are acrylamide and methacrylamide; more preferred is acrylamide. Preferred hydroxyalkyl esters of (meth)acrylic acid are hydroxyethyl acrylate, hydroxyethyl methacrylate, hydroxypropyl acrylate, and hydroxypropyl methacrylate.

The composition of the present invention may be characterized by the polymer solids content, which is the dry weight of polymer contained in the composition, divided by the total weight of the composition, expressed as a percentage. Preferably the polymer solids content is 5% or more; more preferably 20% or more; more preferably 30% or more; more preferably 40% or more. Preferably the polymer solids content is 70% or less; more preferably 60% or less.

The Tg of the polymer of the present invention is preferably −50° C. or higher; more preferably −30° C. or higher. The Tg of the polymer of the present invention is preferably 20° C. or lower. The weight average molecular weight of the polymer of the present invention is preferably 5,000 to 2,000,000; more preferably 100,000 to 2,000,000.

Polymers of the present invention are present in the form of polymer particles (herein called "particles (i)") dispersed in water. Preferred mean particle size on a volume basis of particles (i) is from 50 nanometers to 1,000 nanometers. Preferred polymers of the present invention are formed by emulsion polymerization; the product of emulsion polymerization is a latex. Latexes contain one or more anionic surfactant, one or more nonionic surfactant, or a mixture thereof. Preferably, after completion of the polymerization process, the resulting latex is neutralized by addition of a base to a pH of 6 to 8.

The composition of the present invention contains dispersed particles (herein called "particles (ii)" that contain one or more fatty amide and one or more fatty acid. In particles (ii), 50 mole % or more of the fatty acid is in the carboxylate form, and the weight ratio of erucamide to fatty acid is from 0.12:1 to 2.3:1.

Preferably, the median diameter of the dispersed particles (ii) on a volume basis is 50 micrometers or less; more preferably 20 micrometers or less; more preferably 10 micrometers or less; more preferably 5 micrometers or less. Preferably, the median diameter of the dispersed particles (ii) on a volume basis is 0.01 micrometers or more; more preferably 0.02 micrometers or more; more preferably 0.05 micrometers or more; more preferably 0.1 micrometers or more.

Preferably, the composition of the dispersed particles (ii) is uniform.

In preferred fatty amides, $R^2$ is an unsubstituted hydrocarbyl group having 12 or more carbon atoms; more preferably 16 or more carbon atoms; more preferably 18 or more carbon atoms. In preferred fatty amides, $R^2$ is an unsubstituted hydrocarbyl group having 30 or fewer carbon atoms, more preferably 25 or fewer.

Among type III fatty amides, preferably $R^4$ is an unsubstituted hydrocarbyl group having 12 or more carbon atoms; more preferably 16 or more carbon atoms; more preferably 18 or more carbon atoms. Among type III fatty amides, preferably $R^4$ is an unsubstituted hydrocarbyl group having 30 or fewer carbon atoms, more preferably 25 or fewer. Among type II fatty amides, preferably $R^3$ has 12 or more carbon atoms; more preferably 16 or more carbon atoms; more preferably 18 or more carbon atoms. Among type II fatty amides, preferably $R^3$ has 30 or fewer carbon atoms, more preferably 25 or fewer.

Type I fatty amides are preferred. Preferred fatty amides are erucamide and oleamide; most preferred is erucamide.

Preferably, the amount of fatty amide in the particles is, by weight based on the weight of the particles, 60% or less; more preferably 55% or less. Preferably, the amount of fatty amide in the particles is, by weight based on the weight of the particles, more than 10%; more preferably 15% or more.

Preferably, the amount of fatty acid in the particles is, by weight based on the weight of the particles, 40% or more; more preferably 45% or more. Preferably, the amount of fatty acid in the particles is, by weight based on the weight of the particles, 95% or less; more preferably less than 90%; more preferably 85% or less.

In the particles, the weight ratio of fatty amide to fatty acid is 0.12:1 or higher; preferably 0.18:1 or higher. In the particles the weight ratio of fatty amide to fatty acid is 2.3:1 or lower; preferably 1.5:1 or lower; more preferably 1.2:1 or lower.

Preferably, the $R^1$ group of the fatty acid (as defined above) is an unsubstituted hydrocarbon group having 8 or more carbon atoms; more preferably 14 or more carbon atoms; more preferably 18 or more carbon atoms; more preferably 20 or more carbon atoms. Preferably, the $R^1$ group of the fatty acid is a hydrocarbon group having 30 or fewer carbon atoms; more preferably 25 or fewer carbon atoms. Preferably, the $R^1$ group of the fatty acid is a hydrocarbon group having one or two carbon-carbon double bonds. Preferably, the fatty acid is oleic acid or erucic acid; more preferably erucic acid.

Preferably the $R^1$ group of the fatty acid is the same as the $R^2$ group of the fatty amide.

Preferably, some or all of the fatty acid is in the carboxylate form. Preferably, the mole % of the fatty acid that is in carboxylate form is 50%-100%; more preferably 75%-100%.

Preferably, the amount of fatty amide in the composition of the present invention is, by weight based on the dry weight of the polymer, 0.1% or more; more preferably 0.2% or more. Preferably, the amount of fatty amide in the composition of the present invention is, by weight based on the dry weight of the polymer, 5% or less; more preferably 2% or less.

Preferably, the composition of the present invention is made as follows. In one operation, the vinyl polymer is made by emulsion polymerization to produce particles (i). In a separate operation, a dispersion of particles (ii) is made. Preferably, the dispersion of particles (i) is mixed with the dispersion of particles (ii) and, optionally, other ingredients, to form the composition of the present invention.

Preferably, the dispersion of particles (ii) is made as follows.

A high internal phase emulsion (HIP emulsion) is made, which is defined herein as an emulsion in which the dispersed phase constitutes 30% or more by weight of the emulsion based on the weight of the emulsion. In preferred HIP emulsions, the amount of dispersed phase, by weight based on the weight of the emulsion, is 50% or more; more preferably 70% or more. To produce an HIP emulsion, a mixture (I) is made that contains water, fatty amide, fatty acid, neutralizing agent, optional surfactant, and optional additional ingredients.

Preferably, in mixture (I), the weight ratio of fatty amide to fatty acid is 2.3:1 or lower; more preferably 1.5:1 or lower; more preferably 1.2:1 or lower. Preferably, in mixture (I), the weight ratio of fatty amide to fatty acid is 0.12:1 or higher; more preferably 0.18:1 or higher.

In mixture (I), the amount of water, by weight based on the weight of mixture (I) is preferably 70% or less; more preferably 50% or less; more preferably 30% or less; more preferably 20% or less; more preferably 15% or less. Preferably, in mixture (I), the amount of water, by weight based on the weight of mixture (I) is 1% or more; more preferably 2% or more.

In mixture (I), preferred neutralizing agents are inorganic bases and organic bases. Among organic bases, organic amines are preferred. Inorganic bases are preferred. Preferred inorganic bases are hydroxide compounds; more preferred are sodium hydroxide, potassium hydroxide, and ammonium hydroxide; more preferred are potassium hydroxide and ammonium hydroxide.

In mixture (I), the amount of neutralizing agent is characterized by the equivalent ratio, which is defined herein as the ratio of equivalents of neutralizing agent to the equivalents of fatty acid. Preferably, the equivalent ratio in mixture (I) is 1.2:1 or lower; more preferably 1.01:1 or lower. Preferably, the equivalent ratio in mixture (I) is 0.5:1 or higher; more preferably 0.6:1 or higher; more preferably 0.7:1 or higher.

Preferably, one or more nonionic surfactant is included in mixture (I).

Preferably, shear is applied to mixture (I) by use of a mechanical agitator.

If mixture (I) has more than one melting point, preferably, shear is applied to mixture (I) while mixture (I) is at a temperature that is higher than the highest melting point among the melting points of the one or more fatty amide and the one or more fatty acid present in mixture (I). Preferably, if mixture (I) has a single melting point, shear is applied to mixture (I) while mixture (I) is at a temperature above the melting point of mixture (I).

Preferably, the result of applying shear to mixture (I) is that mixture (I) becomes an HIP emulsion. After formation of the HIP emulsion, the composition is preferably cooled to room temperature. Optionally, after formation of the HIP emulsion, the HIP is diluted by addition of water or other aqueous medium. It is contemplated that cooling to room temperature and adding additional water do not change the particles sizes of the dispersed particles.

The composition of the present invention may optionally contain one or more water dispersible polyol. If one or more polyol is used, the following polyols are preferred. Preferred polyols are polyether polyols, polyester polyols, polyester polyether polyols, or a mixture thereof. Preferred polyols are selected from diols, triols or mixtures thereof. Preferred polyol is sufficiently nonvolatile that it will be fully or at least partially available for reaction with an isocyanate during mixing operations, if an isocyanate is also present in the composition. Preferably the polyol will have a number average molecular weight from 100 to 7500, more preferably 150 to 5000, and still more preferably from 200 to 1000. Preferably, the molecular weight of the polyol is less than 1500 and still more preferably less than 600. An example of a highly preferred polyol is polypropylene glycol (PPG), such as 400 MW polypropylene glycol.

If one or more polyol is present in the composition, the preferred amount of polyol is as follows. Preferred amount of polyol is from 0.1-10% of the solid portion of the composition of the present invention. Preferably the amount of polyol is no more than 5%, more preferably no more than 3%, still more preferably no more than 2%, and most preferably no more than 1.5%. Preferably, the amount of polyol is at least 0.3%, more preferably at least 0.4%, and most preferably at least 0.6%.

The composition of the present invention may optionally be mixed with a curing composition. A curing composition contains one or more curing agent. A curing agent is a compound the molecule of which has two or more reactive groups that are capable of reacting with one or more moiety in the composition to create a polymer, to increase the molecular weight of existing polymers, and/or to produce a crosslinked network. The moiety may be the polymer of the present invention, or another moiety such as a polyol, or a combination thereof. If a curing agent is present, the preferred characteristics of that curing agent are as follows. Preferred curing agents are one or more water dispersible polyisocyanate. The polyisocyanate employed may be any suitable polyisocyanate, but preferably it is an aliphatic polyisocyanate, an aromatic polyisocyanate or a mixture thereof. Preferably, the polyisocyanate is a diisocyanate. Examples of suitable polyisocyanates include those based on toluene diisocyanate (TDI), isophorone diisocyanate (IPDI), hexamethylene diisocyanate (HDI), diphenyl methane diisocyanate (MDI), dicyclohexyl methane diisocyanate (HMDI), isomers thereof or mixtures thereof. Prepolymers of a polyisocyanate and a polyol may also be employed. Aliphatic polyisocyanates are especially preferred.

If one or more polyisocyanate is used, the amount of polyisocyanate is preferably determined as follows. The relative proportions of isocyanate groups to isocyanate-reactive groups may vary as desired, within a molar ratio of NCO/NCO-reactive groups of 1:1 to 8:1. NCO-reactive groups include, e.g., hydroxyl, amino and carboxyl groups. Preferably, the NCO/NCO-reactive group molar ratio is at least 3:1. Preferably, the NCO/NCO-reactive group molar ratio is no more than 5:1. Preferred isocyanate-reactive groups are hydroxyl groups, primary amine groups, secondary amine groups, carboxyl groups, epoxy groups, and carbodiimide groups.

The pH of the resulting overall mixture preferably is 5 to 9 and more preferably is 6 to 8. If carboxyl groups or sulfonic acid groups are attached to the polymer, the most preferred is a range of pH values at which 75 mole % or more of the sulfonic acid groups or the carboxyl groups (whichever are present) attached to the polymer of the present invention are neutralized.

Embodiments are envisioned in which the composition of the present invention does not include any polyol. Also envisioned are embodiments in which the composition of the present invention does not include any polyisocyanate. Also envisioned are embodiments in which the composition of the present invention contains neither polyol nor polyisocyanate. Preferred are embodiments that include one or more polyisocyanate.

It is contemplated that, when practicing embodiments in which one or more polyisocyanate is used, the polyisocyanate will be added to the composition a relatively short time before the composition of the present invention is to be put into use as an adhesive composition. Preferably, the time between forming a single composition that contains both polyisocyanate and the polymeric moiety with which the polyisocyanate is capable of reacting and the step of contacting that composition with the surface of a substrate is 48 hours or less; more preferably 24 hours or less; more preferably 12 hours or less; more preferably 8 hours or less.

Other optional components of the compositions of the present invention include, but are not limited to, agents selected from co-solvents, coalescing agents, pigments or other colorants, fillers, reinforcement (e.g., fibers), dispersants, wetting agents, waxes, catalysts, blowing agents, anti-foam agent, UV absorbers, flame retardants, adhesion promoters, antioxidants, biocides, coalescing agents, or stabilizers. These optional components (as desired) may be added in any order of addition that does not cause an incompatibility between components. Components that do not dissolve in the aqueous carrier (such as pigments and fillers) can be dispersed in the waterborne composition or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethyl-ethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the adhesive composition may be done over an entire surface or only a portion of it, such as along an edge, or at intermittent locations. Once applied to the substrate, the compositions are dried, such as by application of heat and air flow, or some other suitable approach for removing substantially all remaining water.

The adhesive compositions of the present invention may find other suitable application as top coats, or other intermediate coats, thus rendering them potentially useful in paints, inks, plastics, or the like. The adhesive compositions of the present invention can be used on a wide variety of one or a plurality of suitable substrates.

Suitable substrates include, for example, polymers, paper, wood and reconstituted wood products, polymer coated substrates, wax coated paperboard, cardboard, particle board, textiles, leather, and metal (for example, aluminum foil), and metallized plastics.

Preferably, one or more substrate is a polymer. Preferred polymers are polyolefins, polystyrene, polyvinyl chloride, polyacrylates, polyethers, polyamides, polyesters, polyurethanes, polysulfones, polyphenylenes, copolymers thereof, and blends thereof. The category of polyolefins includes homopolymers of olefin monomers such as ethylene, propylene, and butylene and also includes copolymers of olefin monomers with other monomers such as acrylic monomers (such as methyl acrylate), vinyl esters (such as vinyl acetate), and mixtures thereof. Such polymers are considered to include polymers blended with various additives including, for example, impact modifiers, processing aids, lubricants, slip agents, stabilizers, other additives, and mixtures thereof. More preferred are polyolefins, polyesters, and polyamides; more preferred are polyolefins; more preferred are homopolymers of olefin monomers. Among homopolymers of olefin monomers, preferred are polyethylenes; more preferred are low density polyethylenes, including low density polyethylene (LDPE), linear low density polyethylene (LLDPE), high-strength polyethylene (HSPE), and metallocene-catalyzed linear low density polyethylene (mLLDPE). Preferably, one or more substrate is a polymer that contains a slip agent.

Substrates may have any shape or form. Preferred substrates are films. Films are objects that have one dimension that is 250 micrometer (10 mil) or less. The surface of a film that is perpendicular to the smallest dimension is herein called the "face" of the film. A preferred use of the composition of the present invention is lamination (i.e., formation of a laminate). A laminate is formed when the face of one film is bonded to the face of another film. The two films may have the same composition as each other or they may be of different compositions.

Though wet lamination processes are possible, preferably the adhesive composition is particularly useful for dry bond lamination of a plurality of substrates, where each substrate is a film. In a preferred embodiment, a layer of the adhesive composition is applied to a face of a first substrate film, water is removed (e.g., with heated air or otherwise), and the resulting layer of dried adhesive composition is covered with a face of a second substrate film to form a laminated article wherein the two substrate films are bonded together by the dried layer of adhesive composition. In a preferred embodiment, the substrate layers are provided in the form of rolls of substrate material. Preferred sheets are 12 micrometer to 250 micrometer (0.5 to 10 mil) in thickness; more preferred sheets are 12 micrometer to 250 micrometer (0.5 to 5 mil). Larger thicknesses are also possible, as are smaller thicknesses (e.g., 1 or more micrometer).

Preferably, at least one substrate contains one or more slip agent. A slip agent is a composition that reduces the coefficient of friction of a substrate when it is added to that substrate. Preferred are slip agents that reduce the coefficient of friction of polymer films. Preferred slip agents are siloxanes, including organomodified siloxanes, and fatty compounds. Preferred are fatty compounds. More preferred are fatty amides. Preferred fatty amides are the same types of fatty amides described herein above as preferable for inclusion in the composition of the present invention.

The following are examples of the present invention.

Polymers were made by conventional emulsion polymerization. The resulting latexes were adjusted with added base to pH 7.5.

Dispersions of erucamide/erucic acid were made by producing an HIP dispersion as described above. The dispersions were stored at room temperature (approximately 25° C.) for 6 months and were observed to be stable dispersions over that time.

The latex polymer was as follows:

| Monomer | parts by weight |
|---|---|
| butyl acrylate | 78 |
| styrene | 20 |
| acrylic acid | 2 |

The erucamide/erucic acid dispersion was as follows:

| ingredient | parts by weight |
|---|---|
| erucamide | 6.2 |
| erucic acid | 14.3 |
| NH$_4$OH | 1.4 |
| surfactant[1] | 1.0 |
| water | 77.1 |

Note
[1]Pluronic ™ F-108 nonionic surfactant (BASF)

Coefficient of Friction (COF) was measured using test method ASTM D1894 (American Society of Testing and Materials, Conshohocken, Pa., USA).

A Preliminary Mixture was first made. Equal parts by weight of the polymer latex and the erucamide/erucic acid dispersion were mixed to form a liquid with no apparent phase separation.

Various amounts of the Preliminary Mixture was added to 100 g of the latex with good agitation. 2 grams of water dispersible hexamethylene diisocyanate was added. The amount of Preliminary Mixture was chosen in each case to give the concentration of erucamide shown in the Table below. The resulting mixture was coated onto polyethylene terephthalate film at coating weight of 2.44 grams per square meter (1.5 pound per ream) and then dried. a film of high strength polyethylene (HSPE) was laminated onto the layer of dried adhesive. The HSPE was believed to contain a slip aid that was either erucamide or oleamide.

The COF was measured on the HSPE surface on the outside of the laminate. The laminate was stored at room temperature for 1 week, and the COF was measured ("initial" COF). The laminate was then placed in an oven at 50° C. for 24 hours, and then stored at room temperature for 24 hours, and COF was measured ("1 day" COF) again. The COF was measured again ("2 day" COF) one day after that. Results were as follows:

| Example | Erucamide[2] | initial COF | 1 day COF | 2 day COF |
|---|---|---|---|---|
| Comparative | 0% | 0.188 | 0.428 | 0.417 |
| 1 | 0.25% | 0.163 | 0.314 | 0.263 |
| 2 | 0.5% | 0.135 | 0.247 | 0.247 |
| 3 | 1% | 0.106 | 0.238 | 0.230 |

Note
[2]percent erucamide by weight based on the solid weight of polymer

The samples with erucamide all have lower COF than the comparative sample, as desired.

The invention claimed is:

1. An adhesive composition comprising a continuous aqueous medium and further comprising
   (i) particles of a polymer dispersed in said aqueous medium; and
   (ii) particles comprising fatty amide and one or more fatty acid, wherein 50 mole % or more of said fatty acid is in the carboxylate form, and wherein the weight ratio of said fatty amide to said fatty acid is from 0.12:1 to 2.3:1, wherein said particles comprising fatty amide and one or more fatty acid are dispersed in said aqueous medium, and wherein the amount of fatty amide is 0.1% to 5% by weight based on the dry weight of the polymer.

2. The adhesive composition of claim 1, wherein said fatty amide comprises erucamide.

3. The adhesive composition of claim 1, wherein said polymer is a vinyl polymer.

4. A method of bonding a first substrate to a second substrate, wherein said method comprises
   (a) applying a layer of the composition of claim 1 to a surface of said first substrate,
   (b) drying said layer of the composition of claim 1 to remove water, and
   (c) contacting a surface of said second substrate to said layer,
   wherein one or both of said first substrate and said second substrate comprises one or more slip agent.

5. A bonded structure formed by the method of claim 4.

* * * * *